United States Patent
Emami et al.

(10) Patent No.: US 10,997,776 B2
(45) Date of Patent: May 4, 2021

(54) CONNECTING SPATIAL ANCHORS FOR AUGMENTED REALITY

(71) Applicant: Microsoft Technology Licensing, LLC, Redmond, WA (US)

(72) Inventors: Ali Reza Emami, Seattle, WA (US); Gabriel Takacs, Issaquah, WA (US); Gavin Dean Lazarow, Redmond, WA (US); Skyler Mark Goodell, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/404,509

(22) Filed: May 6, 2019

(65) Prior Publication Data

US 2020/0273235 A1    Aug. 27, 2020

Related U.S. Application Data

(60) Provisional application No. 62/809,603, filed on Feb. 23, 2019.

(51) Int. Cl.
*G06T 7/50* (2017.01)
*G06T 15/20* (2011.01)
(Continued)

(52) U.S. Cl.
CPC .............. *G06T 15/20* (2013.01); *G06T 7/50* (2017.01); *G06T 7/75* (2017.01); *G06T 19/003* (2013.01); *H04W 4/026* (2013.01); *H04W 4/027* (2013.01)

(58) Field of Classification Search
None
See application file for complete search history.

(56) References Cited

U.S. PATENT DOCUMENTS 9,965,140 B2 *  5/2018  Gabara ............... G06F 3/04886
2004/0046779 A1 *  3/2004  Asano ................. G06Q 20/102
715/716

(Continued)

FOREIGN PATENT DOCUMENTS

WO        2016148851 A1     9/2016

OTHER PUBLICATIONS

"International Search Report and Written Opinion Issued in PCT Application No. PCT/US20/014684", dated Apr. 24, 2020, 12 Pages.

*Primary Examiner* — Steven Z Elbinger
(74) *Attorney, Agent, or Firm* — Alleman Hall Creasman & Tuttle LLP (57) ABSTRACT

One example provides a computing device configured to capture, via the camera, first image data imaging a first physical world location, create a first spatial representation of the first physical world location based on the first image data, receive a user input defining a pose of a first virtual spatial anchor point relative to a feature imaged in the first image data, track user movement to a second physical world location, capture second image data imaging the second physical world location, receive a user input defining a pose of a second virtual spatial anchor point relative to a feature imaged in the second image data, and send, to a remote computing device, data representing the first spatial representation, the pose of first spatial anchor point, the second spatial representation, the pose of second spatial anchor point, and a positional relationship between first and second spatial anchor points.

20 Claims, 7 Drawing Sheets

(51) Int. Cl.
*H04W 4/02* (2018.01)
*G06T 19/00* (2011.01)
*G06T 7/73* (2017.01)

(56) References Cited

U.S. PATENT DOCUMENTS

| | | | |
|---|---|---|---|
| 2011/0258175 A1* | 10/2011 | Kim | G09G 5/377 |
| | | | 707/709 |
| 2017/0177939 A1* | 6/2017 | Beall | G06K 9/2063 |
| 2018/0053315 A1* | 2/2018 | Ard | G06F 1/163 |
| 2018/0120106 A1* | 5/2018 | Sato | G06T 17/05 |
| 2018/0344286 A1* | 12/2018 | Mienkina | A61B 5/4848 |

* cited by examiner

CONNECTING SPATIAL ANCHORS FOR AUGMENTED REALITY

CROSS REFERENCE TO RELATED APPLICATIONS

This application claims priority to U.S. Provisional Patent Application Ser. No. 62/809,603, filed Feb. 23, 2019, the entirety of which is hereby incorporated herein by reference for all purposes.

BACKGROUND

Augmented reality and mixed reality may be provided by displaying virtual content overlaid upon a real-world view of the physical world. Virtual content, such as holograms, may be positionally associated with a feature that is present within the physical world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a computing device, comprising a camera, a processor, and memory storing instructions executable by the processor to capture, via the camera, first image data imaging a first physical world location, create a first spatial representation of the first physical world location based on the first image data, receive a user input defining a pose of a first virtual spatial anchor point relative to a feature imaged in the first image data, track user movement to a second physical world location, capture, via the camera, second image data imaging the second physical world location, receive a user input defining a pose of a second virtual spatial anchor point relative to a feature imaged in the second image data, and send, to a remote computing device, data representing the first spatial representation, the pose of first virtual spatial anchor point, the second spatial representation, the pose of second virtual spatial anchor point, and a positional relationship between first virtual spatial anchor point and second virtual spatial anchor point identified from the user movement.

Another example provides a method performed by a computing system, comprising receiving, from a first computing device, data representing a first spatial representation of a first physical world location based on first image data captured via a camera, a pose of a first virtual spatial anchor within the first image data, a second spatial representation of a second physical world location based on second image data captured via the camera, a pose of a second virtual spatial anchor within the second image data, and a spatial relationship between the first and second virtual spatial anchors. The method further comprises receiving from a requesting computing device, data representing a third spatial representation of the first physical world location based on image data captured via a camera of the requesting computing device, comparing the third spatial representation to one or more spatial representations received from the first computing device to identify the first spatial representation as matching the third spatial representation, determining a perspective-dependent pose of the first virtual spatial anchor based on comparing the third spatial representation to the first spatial representation and the pose of the first virtual spatial anchor, determining a perspective-dependent pose of the second virtual spatial anchor based on the spatial relationship between the first and second virtual spatial anchors and the pose of the second virtual spatial anchor, and sending data representing the perspective-dependent poses of the first virtual spatial anchor and the second virtual spatial anchor to the requesting mobile device.

Another example method provides a computing device, comprising a camera, a processor, and memory storing instructions executable by the processor to capture, via the camera, image data imaging a first physical world location, create a spatial representation of the first physical world location based on the image data, send the spatial representation to a remote computing service, receive, from the remote computing service, a pose of a first virtual spatial anchor relative to the computing device, the first virtual spatial anchor being located within the first physical world location, receive, from the remote computing service, a pose of a second virtual spatial anchor relative to the computing device, the second virtual spatial anchor being located at a second physical world location currently being out of view of the camera of the computing device, display information regarding the location of second virtual spatial anchor relative to the computing device, track motion of the computing device toward the second virtual spatial anchor, and display updated information regarding the location of the second virtual spatial anchor relative to the computing device.

DETAILED DESCRIPTION

Figure 1:
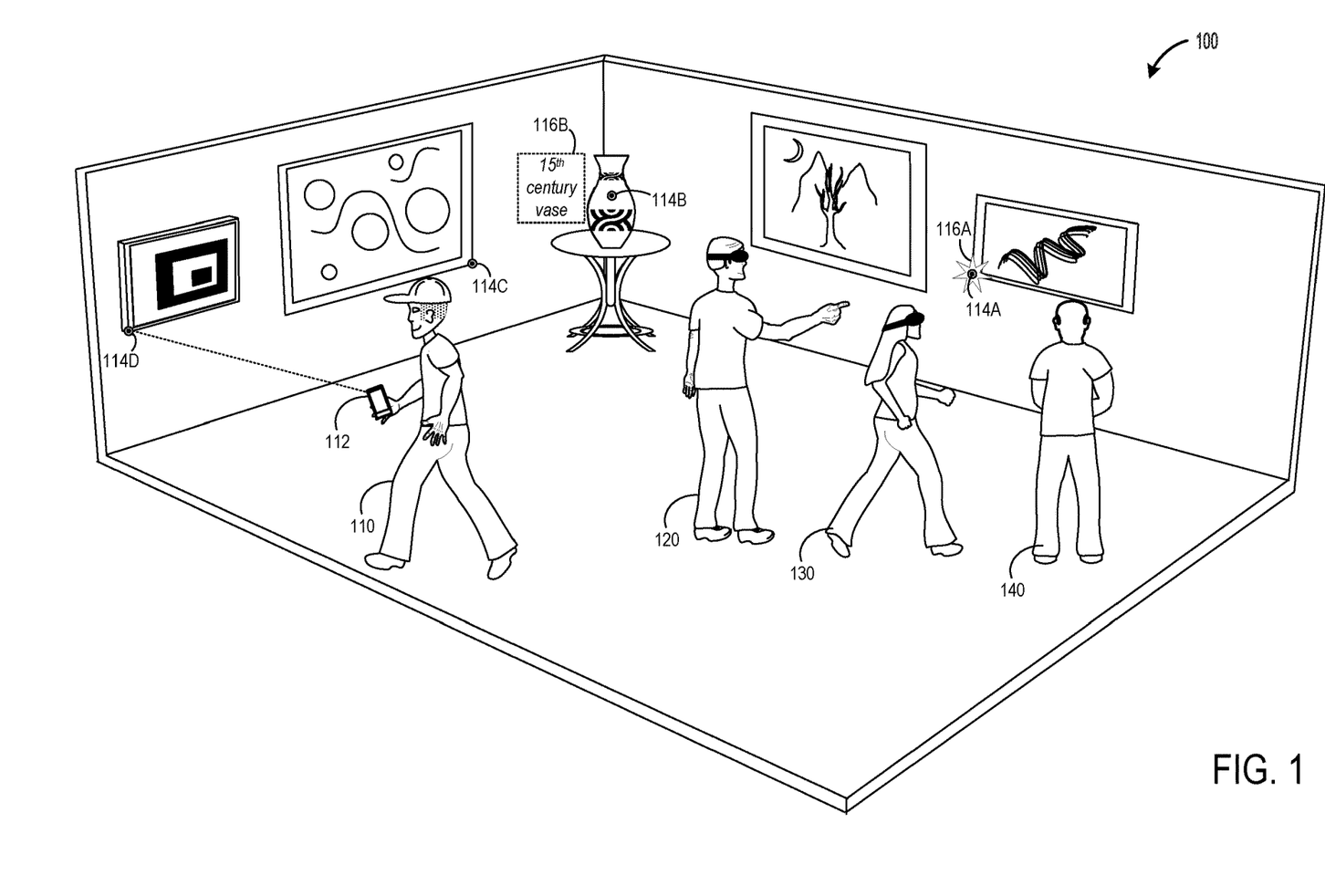
FIG. 1 depicts an example environment within which spatial anchors may be used to represent points of interest.

FIG. 1 depicts an example environment 100 within which user-designated virtual spatial anchors may be used to represent points of interest. Such spatial anchors may empower developers to build spatially aware augmented reality and mixed reality applications. These applications may support a variety of mobile device hardware and/or operating systems, including as an example: Microsoft HoloLens™, iOS-based devices supporting ARKit, and Android-based devices supporting ARCore. Spatial anchors enable developers to work with augmented reality and mixed reality platforms to perceive spaces, designate precise points of interest, and to recall those points of interest from supported devices.

Within FIG. 1, a user 110 uses a mobile device 112 to create spatial anchors 114A, 114B, 114C, 114D, etc. at various physical world locations throughout the environment. As an example, environment 100 may be a museum or gallery containing physical works of art, and user 110 may provide a virtual tour by adding spatial anchors to specific works of art. Virtual content, such as holograms, may be associated with spatial anchors. User 110 and other users 120, 130, and 140 may view this virtual content via their respective mobile devices. In this example, user 110 is operating a handheld mobile device, whereas users 120, 130, and 140 are wearing head mounted display (HMD) devices.

Virtual content may be located at a spatial anchor, or may be offset from a spatial anchor with which it is associated. For example, arbitrary virtual content 116A illustrated as a star is located at spatial anchor 114A with which it is associated. As another example, virtual content 116B (e.g., text-based content "15$^{th}$ century vase") is offset from spatial anchor 114B with which it is associated. Additionally or alternatively, audio content may be associated with a spatial anchor that is playable or that plays automatically via a mobile device when the mobile device is within a threshold proximity (e.g., 3 meters or other suitable value) to the spatial anchor. For example, the audio content may include a human voice that offers a description of a physical object to which the spatial anchor is linked, such as "15th century vase" with respect to spatial anchor 114B. Some spatial anchors may not be associated with virtual content or audio content.

As described in further detail herein, a user may create a spatial anchor by imaging the physical environment via a camera, and defining a location and/or an orientation of the spatial anchor relative to a feature captured by the camera. For example, spatial anchor 114D may be located at a corner of a physical picture frame that is captured within a camera view of mobile device 112. Once the location and/or orientation of the spatial has been defined, a position and/or orientation of virtual content may be defined relative to that spatial anchor. The term "pose" may be used herein to describe the position and/or orientation of spatial anchors or their virtual content relative to a mobile device.

Because spatial anchors may be tied to features within the physical environment, spatial anchors or their virtual content that reside outside of a camera view of a mobile device may not be perceived by users within the context of augmented reality or mixed reality. Thus, as described in more detail below, connectivity data that positionally relates spatial anchors may be stored for spatial anchors, thereby allowing users to create connected anchors in a space. The connectivity data allows other users to inquire and learn whether there are spatial anchors located nearby, and the direction and distance to those anchors. Some example use-cases enabled with connected anchors follow.

As one example, a worker needs to carry out a procedure that involves visiting various locations in an industrial factory. The factory has placed spatial anchors at each site involved in the procedure. A mobile device helps guide the worker from one location to the next. The mobile device may contact a cloud-based service to first ask for the spatial anchors that are nearby, and then guide the worker to the next location. The mobile device displays visual indicators about the general direction and distance to the next location to complete the task.

As another example, a museum creates spatial anchors at public displays that together create a specific tour through the museum such as "a one-hour tour of important public displays". When visitors are at one public display, they may open the museum's mixed reality/augmented reality app on their mobile device. Then, they may point their phone around the space and through a camera feed, and see the general direction and distance to the other public displays on the tour. As the user starts to walk towards one of the public displays, the app progressively updates the general direction and distance to help guide users there.

Spatial anchors also may facilitate multi-user experiences. For example, two people can start a game of mixed reality chess by placing a virtual chess board on a table. Then, by pointing their device at the table, they can view and interact with the virtual chess board together.

As mentioned above, spatial anchors may be connected together, creating relationships between them. For example, an application may include an experience that has two or more points of interest that a user must interact with to complete a task. Those points of interest can be created in a connected fashion. Later, when the user is completing the multi-step task, the app can ask for anchors that are nearby the current one to direct the user towards the next step in the task.

As a more specific example, an app may use "line-of-sight" direction and distance between anchors to provide guidance hints to users. Such a scenario may be referred to as way-finding. In some examples, e.g. where spatial anchors are placed at suitably spaced intervals, way-finding may be similar to turn-by-turn navigation. In other examples, where spatial anchors are placed at destinations corresponding to points of interest, rather than along a path, wayfinding may be more analogous to the provision of hints about the general direction of the destination, and the user's inference or knowledge of the space also helps to navigate through the structure to the destination.

In some examples, building a way-finding experience involves preparing a space for the experience and developing an app that end users will interact with. Such a building process may include planning the space by determining locations within the space that participate in the way-finding experience. This may be performed, for example, by a museum tour coordinator, factory supervisor, or the like, depending upon the environment in which the way-finding experience will be implemented.

Next, to place and connect spatial anchors, a person visits the chosen locations and creates spatial anchors at those locations. The placement may be performed, for example, using an admin mode of an end-user application, or a different application entirely from the end-user application. Through this process, each anchor is connected or related to the others. These relationships are maintained in a computer network-accessible cloud-based service.

As an example end-user experience, a first step for end users may be to locate one of the anchors using an end-user application running on a mobile device, which can be in any one of the chosen locations. In some examples, determining the locations where end users can enter the experience may be a part of designing the experience. Once the end user has located one anchor, the app can request nearby anchors. This procedure returns a pose between the device and these anchors, wherein the term pose may indicate a position and orientation of the anchors relative to the device. The end-user application may then take advantage of the pose to each of these anchors to render useful guidance hints about their general direction and distance. For instance, the end-user application may display an icon and arrow on a camera feed representing each potential destination.

As the end user moves between spatial anchors, the end-user application may periodically calculate a new pose between the device and the destination anchor. The app then may refine the guidance hints that help the user arrive at the destination.

To build a way-finding experience, connected spatial anchors may be placed in the chosen locations. An example of connecting anchors in a single session follows. First, a person setting up the way-finding experience (referred to herein as an "admin") walks to the first location and creates Anchor A, e.g. by using a function in an administrator application or an admin portion of an end-user application. The admin walks to the second location while the underlying MR/AR platform continues to track the user (e.g. by inertial motion sensors, camera, and/or other suitable motion sensors). The admin creates Anchor B with the same admin function. Anchors A and B are now connected, and this relationship is maintained by a cloud-based network-accessible service. The procedure may continue for all anchors to be connected.

In other examples, anchors may be connected in multiple sessions. This allows an admin to create and connect some anchors at one time, and later create and connect more anchors. An example of connecting anchors in multiple sessions is as follows. First, the admin uses the anchor creation function to create some anchors in one session. Later, for instance on a different day, the app locates one of these anchors, as described below with regard to the location of anchors by end users. The admin walks to a new location, while the underlying MR/AR platform continues to track the user. Using same anchor creation function, the admin creates anchor C. Anchors A, B, and C are now connected and this relationship is maintained by the network-accessible service. The admin can continue this procedure for more anchors and more sessions over time.

The admin app can verify that two anchors are connected by issuing a query to the network-accessible service for nearby anchors. When the result of the query contains the desired target anchor, then the app has confirmation that the anchors are connected. If they aren't connected, the app can retry the connection procedure again. Anchors may fail to connect where the underlying MR/AR tracker lost tracking during the process of connecting anchors, or there was a network error communicating with the network-accessible service and the anchor connection could not be persisted.

Once the spatial anchors are placed, the admin application, or an end-user application, may allow a user to place virtual objects associated with anchor points. For example, in an office setting, a user may place a virtual calendar on a conference room wall. In an industrial setting, a user could receive contextual information about a machine by pointing a supported device camera at it.

In some examples, a spatial anchor app may comprise a managed service and client software development kits (SDKs) for supported device platforms. When an anchor is created, a client SDK captures environment information around that point and transmits it to the service. Then, when another device looks for the anchor in that same space, the device transmits similar data to the service. The service matches the data against the environment information previously stored. The position of the anchor relative to the device is then sent back for use in the application.

Figure 2:
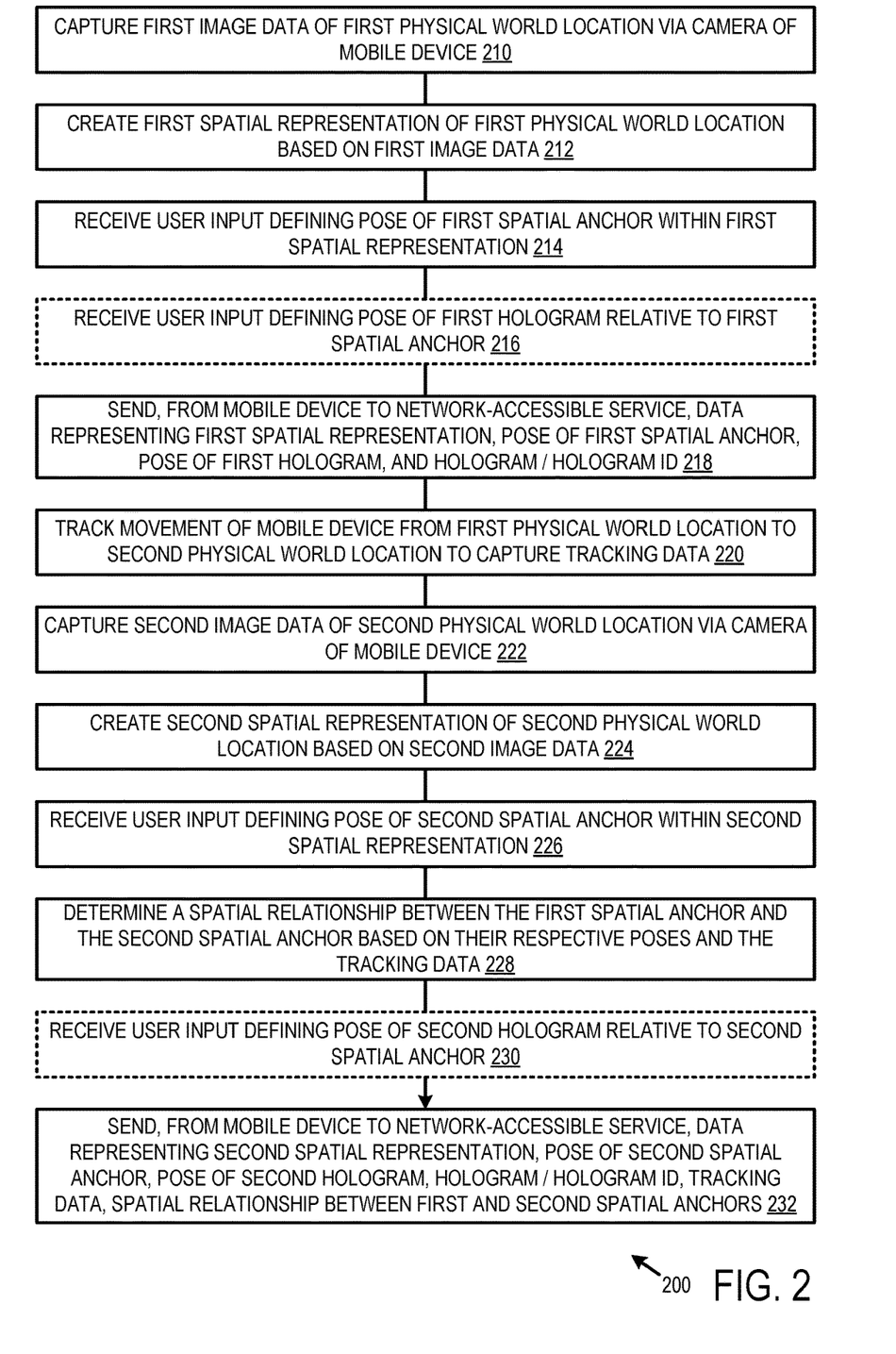
FIG. 2 is a flow diagram depicting an example method for creating spatial anchors that are spatially connected with each other.

FIG. 2 is a flow diagram depicting an example method 200 for creating spatial anchors that are spatially connected with each other. In an example, method 200 is performed by a computing device or computing system, such as a mobile device (e.g. a smart phone, a head-mounted device, etc.). In this example, the mobile device is operated by a user to create spatial anchors.

At 210, the method includes capturing, via a camera of a mobile device, first image data imaging a first physical world location. In an example, the camera is a visible light camera (e.g., an RGB camera). In another example, two or more cameras may be used to capture image data, including a visible light camera and a depth camera.

At 212, the method includes creating a first spatial representation of a first physical world location based on the first image data. In some examples, the first spatial representation may take the form of a sparse point cloud determined from image data, such as visible RGB image data. The points of the sparse point cloud may have location and/or orientation values defined in relative to the mobile device or its camera. In other examples, any other suitable image data may be provided, such as first depth image data captured by an on-board depth image sensor. For example, the first spatial representation of the first physical world location may be alternatively or additional based on the first depth image data.

At 214, the method includes receiving user input defining a pose of a first virtual spatial anchor within the first spatial representation. The pose of the first virtual spatial anchor may be defined relative to a feature of the physical world imaged in the first image data. The user input may take various forms. In an example, a user may touch a graphical display presenting the camera view at a desired location of the spatial anchor. As another example, a user may look at a particular point within the physical environment, and an eye tracking camera may determine where that point is located within a camera view captured by a forward-facing camera. In at least some examples, a pose of a virtual spatial anchor point created via a mobile device defines a location and/or an orientation of the virtual spatial anchor point in three-dimensional space relative to the computing device. Location and/or orientation values may be defined in up to 6 DOF as measured in relation to the mobile device. For example, the mobile device may represent the origin within a local coordinate system of the first spatial representation.

In some scenarios, a user may associate a hologram or other virtual content with a spatial anchor. For example, at 216, the method includes receiving user input defining a pose of a first hologram relative to the first virtual spatial anchor. The pose of the first virtual hologram may define a location and/or an orientation relative to the first virtual spatial anchor point in up to 6 DOF. However, a hologram may not be associated with a spatial anchor in some scenarios.

At 218, the method includes sending, from the mobile device to a network-accessible service, data representing the first spatial representation, the pose of the first virtual spatial anchor, the pose of the first hologram if defined), and one or more of the first hologram and/or an identifier of the first hologram if defined). The network-accessible service stores this data in a relationship graph, which may be made accessible to the mobile device across multiple sessions and to other devices. The network-accessible service may be hosted at one or more remote computing devices, such as a server system.

A user may create any suitable quantity of spatial anchors within the physical world, and may associate any suitable quantity of holograms with particular spatial anchors. For example, after creating the first virtual spatial anchor, the user may move with the mobile device to a second physical world location to create a second virtual spatial anchor.

At 220, the method includes tracking movement of the mobile device from the first physical world location to or toward the second physical world location to capture tracking data. The tracking data describes the movement of the mobile device between the first and second physical world locations in 6 DOF space. Movement of the mobile device may be tracked based on sensor data obtained from one or more sensors, including the camera, inertial sensors, geo-positioning sensors (e.g., GPS, wireless network connectivity), etc. The mobile device may use sensor fusion of multiple different types of sensors to track its movement between locations.

At 222, the method includes capturing second image data of the second physical world location via the camera of the mobile device. At 224, the method includes creating a second spatial representation of the second physical world location based on the second image data. The second spatial representation may take the form of a sparse point cloud, as an example. Any other suitable image data may be provided, such as second depth image data captured by an on-board depth image sensor. For example, the second spatial representation of the second physical world location may be alternatively or additional based on the second depth image data.

At 226, the method includes receiving user input defining a pose of a second virtual spatial anchor within the second spatial representation. The pose of the second virtual spatial anchor may be defined relative to a feature of the physical world imaged in the second image data. At 228, the method includes determining a spatial relationship between the first virtual spatial anchor and the second virtual spatial anchor based on their respective poses and the tracking data.

As described above, in some scenarios, a user may associate a hologram with a spatial anchor. For example, at 230, the method includes receiving user input defining a pose of a second hologram relative to the second virtual spatial anchor. However, a hologram may not be associated with a spatial anchor in some scenarios.

At 232, the method includes sending, from the mobile device to the network-accessible service, data representing the second spatial representation, the pose of the second virtual spatial anchor, the pose of the second hologram (if any), one or more of the second hologram and/or an identifier of the second hologram (if defined), the tracking data describing the movement of the mobile device between the first and second physical world locations, and the spatial relationship between the first and second virtual spatial anchors. The network-accessible service stores this data in the relationship graph in which data representing the first spatial representation, the pose of the first virtual spatial anchor, and the pose of the first hologram (if any) was stored.

Figure 3:
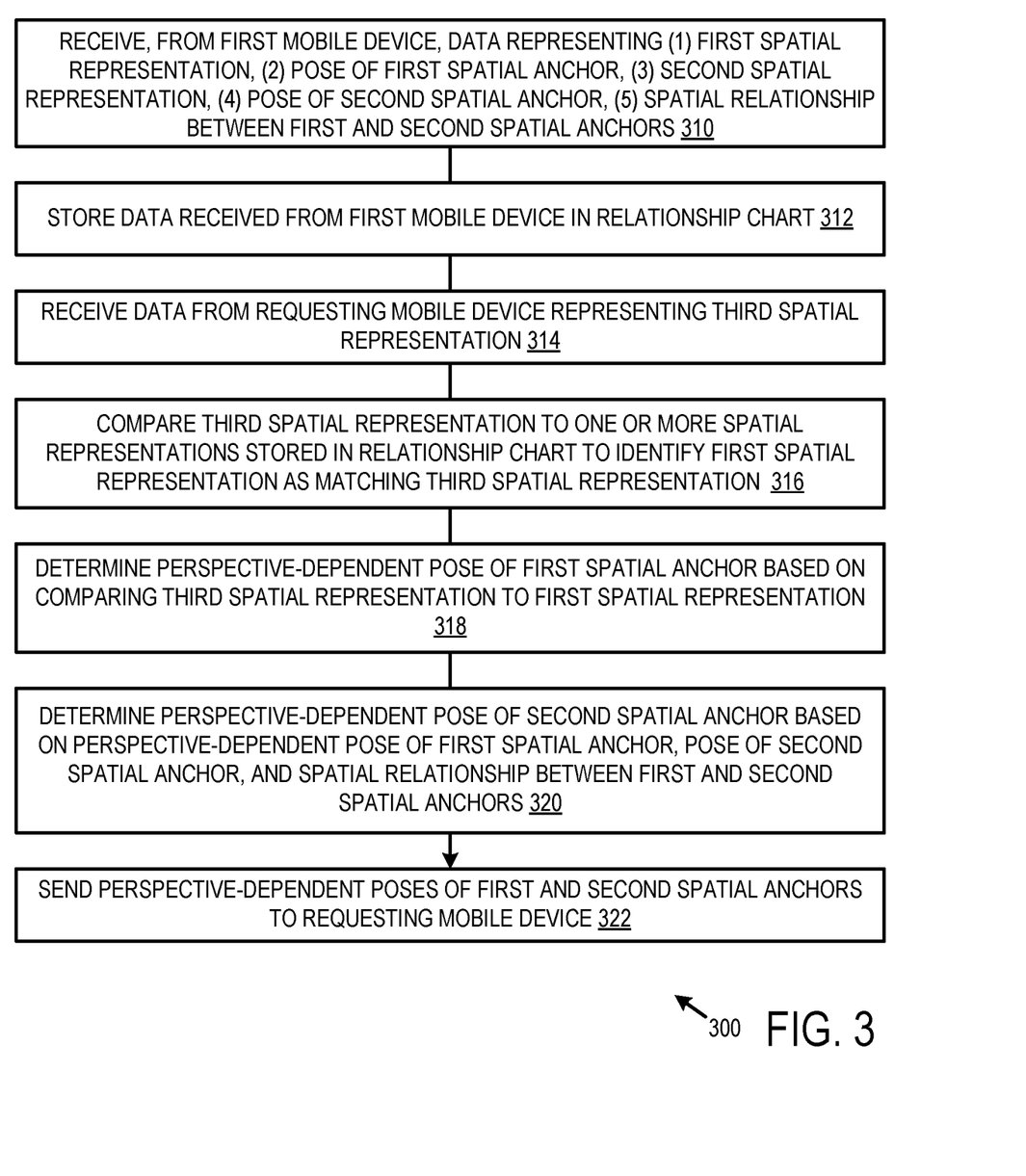
FIG. 3 is a flow diagram depicting an example method for facilitating an exchange between a creator of spatial anchors and a consumer of the spatial anchors.

FIG. 3 is a flow diagram depicting an example method 300 for facilitating an exchange between a creator of spatial anchors and a consumer of the spatial anchors. Method 300 may be performed by a computing device or computing system. In an example, method 300 is performed by a computing system that hosts a network-accessible service, such as the service to which the mobile device of FIG. 2 sent its data at 218 and 232.

At 310, the method includes receiving, from a first mobile device, data representing a first spatial representation of a first physical world location, a pose of a first virtual spatial anchor within the first spatial representation, a second spatial representation of a second physical world location, a pose of a second virtual spatial anchor within the second spatial representation, and a spatial relationship between the first and the second virtual spatial anchors. In this example, a user of the first mobile device is a creator of spatial anchors. The mobile device of FIG. 2 is an example of the first mobile device, and the data received at 310 may correspond to the data sent by the mobile device of FIG. 2 at 218 and 232. Additionally, in some examples, a user may have defined a pose of a hologram with respect to the first and/or second virtual spatial anchors. The data received at 310 may additionally include a pose of a first hologram relative to the first virtual spatial anchor, a pose of a second hologram relative to the second virtual spatial anchor, the first hologram and/or an identifier of the first hologram, and the second hologram and/or an identifier of the second hologram. The data received at 310 may have been sent by the first mobile device during one or more sessions.

At 312, the method includes storing the data received from the first mobile device. As an example, the service may maintain a relationship graph within which the data received from mobile devices may be stored. The relationship graph may define associations between spatial representations, spatial anchors, and their virtual content. Additionally, the method at 312 may include storing hologram data and associating the hologram data with their respective virtual spatial anchor points. For example, a pose of a first hologram may be associated with the first virtual anchor point, and a pose of a second hologram may be associated with the second virtual anchor point.

At 314, the method includes receiving, from a requesting mobile device, data representing a spatial representation of the first physical world location, such as sparse point cloud data determined from an on-board RGB camera of the requesting mobile device. The requesting mobile device may be a second mobile device that differs from the first mobile device, or the requesting mobile device may be the first mobile device operating in a different session than a session during which the data received at 310 was sent by the first mobile device.

At 316, the method includes comparing the spatial representation received to one or more spatial representations stored in the relationship chart to identify the stored first spatial representation as matching the spatial representation received. As an example, features present within two spatial representations may be compared with each other to determine whether the spatial representations correspond to the same physical world location.

At 318, the method includes determine a perspective-dependent pose of the first virtual spatial anchor based on one or more of the pose of the first virtual spatial anchor and the comparison the third spatial representation to the first spatial representation. In this example, the perspective-dependent pose describes the pose of the first virtual spatial anchor from the perspective of the requesting mobile device as determined from the spatial representation sent by the requesting mobile device.

At 320, the method includes determining a perspective-dependent pose of the second virtual spatial anchor based on one or more of the perspective-dependent pose of the first virtual spatial anchor, the pose of the first virtual spatial anchor as received at 310, the pose of the second virtual spatial anchor as received at 310, and the spatial relationship between the first and the second virtual spatial anchors. In this example, the perspective-dependent pose describes the pose of the second virtual spatial anchor from the perspective of the requesting mobile device as determined from the spatial representation sent by the requesting mobile device.

At 322, the method includes sending data representing the perspective-dependent poses of the first and second virtual spatial anchors to the requesting mobile device. The data sent at 322 may additionally include a pose of a first hologram relative to the first virtual spatial anchor, a pose of a second hologram relative to the second virtual spatial anchor, the first hologram and/or an identifier of the first hologram, and the second hologram and/or an identifier of the second hologram.

Figure 4:
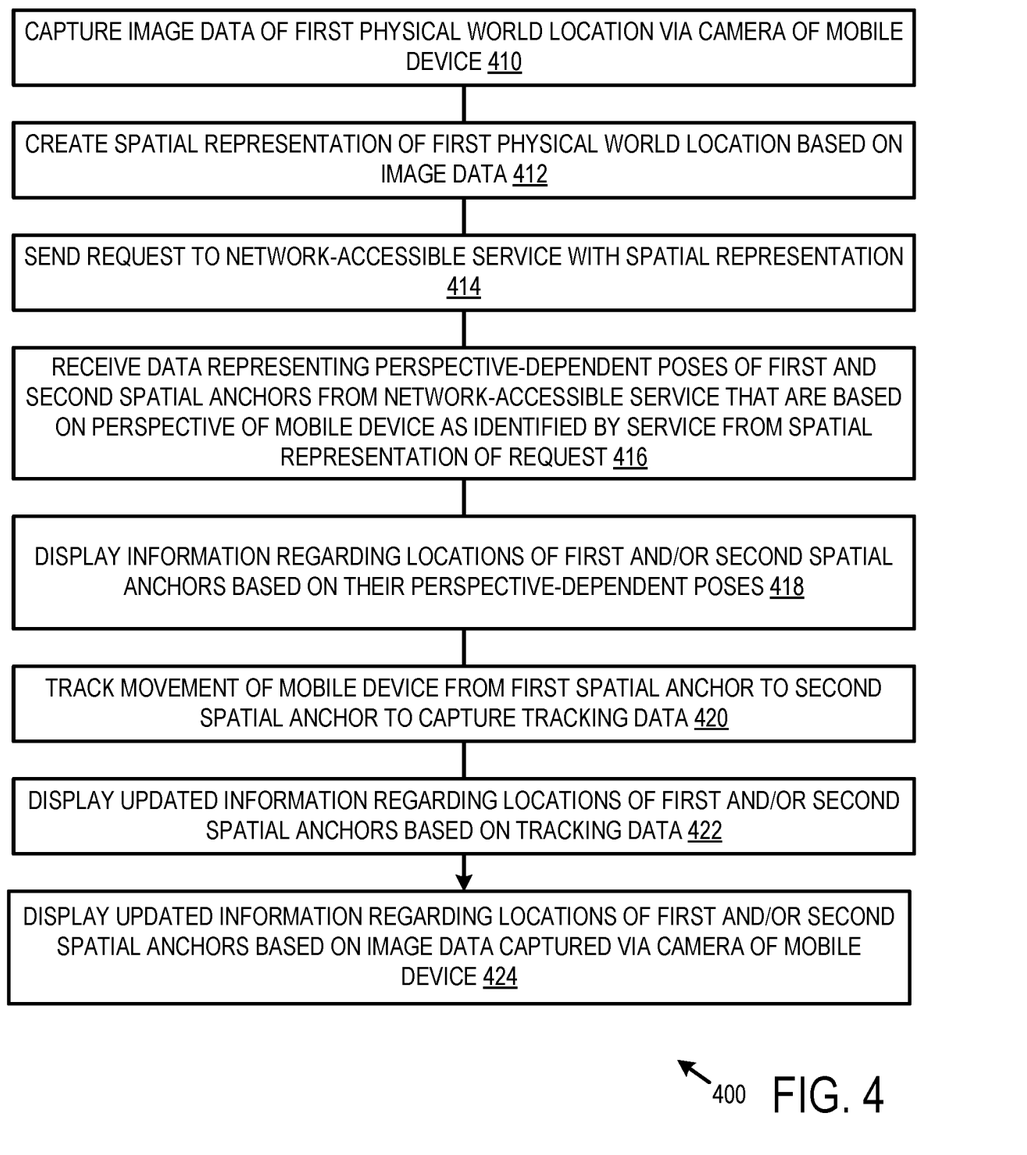
FIG. 4 is a flow diagram depicting an example method for utilizing previously created spatial anchors.

FIG. 4 is a flow diagram depicting an example method 400 for utilizing previously created spatial anchors. In an example, method 400 is performed by a computing device or computing system, such as a mobile device. In this example, the mobile device is operated by a user as a consumer of spatial anchors.

At 410, the method includes capturing, via a camera of a mobile device, image data imaging a first physical world location. In an example, the camera is a visible light camera (e.g., an RGB camera, grayscale camera, etc.). In another example, two or more cameras may be used, including a visible light camera and/or a depth camera. The first physical world location of 410 may refer to the same first physical world location of 210 of FIG. 2.

At 412, the method includes creating a spatial representation of the first physical world location based on the image data. Where the image data is RBG or grayscale two-dimensional image data, the spatial representation may take the form of a sparse point cloud, as an example.

At 414, the method includes sending a request to a network-accessible service with the spatial representation of the first physical world location.

At 416, the method includes receiving data representing perspective-dependent poses of first and second virtual spatial anchors from the network-accessible service that are based on a perspective of the mobile device as identified by the service from the spatial representation of the request. As an example, the first virtual spatial anchor may refer to the first virtual spatial anchor of 214 of FIG. 2, and the second virtual spatial anchor may refer to the second virtual spatial anchor of 226 of FIG. 2. The data received at 416 may further include data representing holograms and their respective poses that are associated with the first and second virtual spatial anchors, such as may have been previously defined at 218 or 232 of FIG. 2. In an example, a hologram identifier received at 416 may enable a mobile device to request and receive data representing the hologram from another remote source or from local memory for display of the hologram at a pose define relative to a virtual spatial anchor point.

At 418, the method includes displaying information regarding locations of the first and/or second virtual spatial anchors based on their perspective-dependent poses. As an example, the camera of the mobile device may be initially imaging the first physical world location containing the first virtual spatial anchor while the second virtual spatial anchor may reside outside of the camera view. In this example, a hologram associated with first virtual spatial anchor (or other suitable virtual content) may be displayed at its pose defined relative to the first virtual spatial anchor (such as may be defined at 216 of FIG. 2), whereas a direction indicator that identifies a direction from the mobile device to the second virtual spatial anchor may be displayed while the second virtual spatial anchor resides outside of the camera view. The direction indicator may assist the user with way-finding with respect to the second virtual spatial anchor. As another example, the information regarding locations of the first and/or second virtual spatial anchors may include text representing navigation instructions.

In some examples, audio information associated with a spatial anchor may be output by the mobile device when the mobile device is within a threshold proximity of the spatial anchor or may be playable by a user selecting an audio playback selector that is presented to the user via the mobile device. The audio information may be associated with the spatial anchor using a similar workflow as the virtual content discussed above.

At 420, the method includes tracking movement of the mobile device from the first virtual spatial anchor to the second virtual spatial anchor to capture tracking data.

At 422, the method includes displaying updated information regarding locations of the first and/or second virtual spatial anchors based on the tracking data. As an example, the camera of the mobile device may be moved to a different location or orientation in which the second virtual spatial anchor is within the camera view and the first virtual spatial anchor is outside of the camera view. In this example, a hologram associated with second virtual spatial anchor (or other suitable information) may be displayed at its pose defined relative to the second virtual spatial anchor (such as may be defined at 230 of FIG. 2), whereas a direction indicator that identifies a direction from the mobile device to the first virtual spatial anchor may be displayed while the first virtual spatial anchor resides outside of the camera view. The direction indicator may assist the user with way-finding with respect to the first virtual spatial anchor.

At 424, the method includes displaying updated information regarding locations of the first and/or second virtual spatial anchors based on image data captured via the camera of the mobile device. Continuing with the example above, as the mobile device is further moved within range of the second virtual spatial anchor at a second physical world location, the operations described at 410, 412, 414, and 416 may be performed for this location to receive data representing an updated perspective-dependent pose for the second virtual spatial anchor. In contrast to the perspective-dependent pose for the second virtual spatial anchor that was received at 416 while the anchor was not within the camera view, the updated perspective-dependent pose may be more accurate due to the inclusion of image data. The information displayed regarding the location of the second virtual spatial anchor may be updated at 424 to reflect this more accurate pose.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
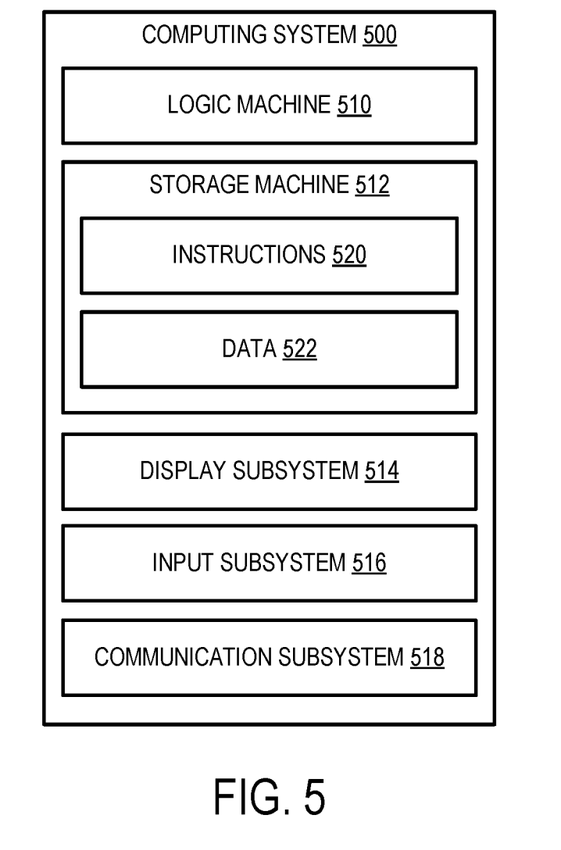
FIG. 5 is a schematic diagram depicting an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smartphone), head-mounted display (HMD) device, an IoT device with sensors, robotic devices (e.g., autonomous robots), and/or other computing devices.

Computing system 500 includes a logic machine 510 and a storage machine 512. Computing system 500 may optionally include a display subsystem 514, input subsystem 516, communication subsystem 518, and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 512 includes one or more physical devices configured to hold instructions 520 executable by the logic machine to implement the methods and processes described herein. When such methods and processes are implemented, the state of storage machine 512 may be transformed—e.g., to hold different data. Storage machine 512 may hold other data 522, which may include the various examples of data described herein.

Storage machine 512 may include removable and/or built-in devices. Storage machine 512 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 512 may include volatile, nonvolatile, dynamic, static, read/write, read-only, random-access, sequential-access, location-addressable, file-addressable, and/or content-addressable devices.

It will be appreciated that storage machine 512 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 514 may be used to present a visual representation of data held by storage machine 512. This visual representation may take the form of a graphical user interface (GUI). Within the context of mixed reality or augmented reality, the GUI may include a camera feed having virtual content or other graphical elements overlaid upon the camera feed, as an example. As the herein described methods and processes change the data held by the storage machine, and thus transform the state of the storage machine, the state of display subsystem 514 may likewise be transformed to visually represent changes in the underlying data. Display subsystem 514 may include one or more display devices utilizing virtually any type of technology. Computing system 500 may further include one or more audio speakers or may include a wired or wireless audio interface by which audio content may be output via peripheral audio speakers (e.g., headphones). Such display devices and/or audio speakers/audio interfaces may be combined with logic machine 510 and/or storage machine 512 in a shared enclosure, or such display devices may be peripheral display and/or audio devices.

When included, input subsystem 516 may comprise or interface with one or more user-input devices such as a keyboard, mouse, touch screen, camera, microphone, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 518 may be configured to communicatively couple computing system 500 with one or more other computing devices. Communication subsystem 518 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Figure 6:
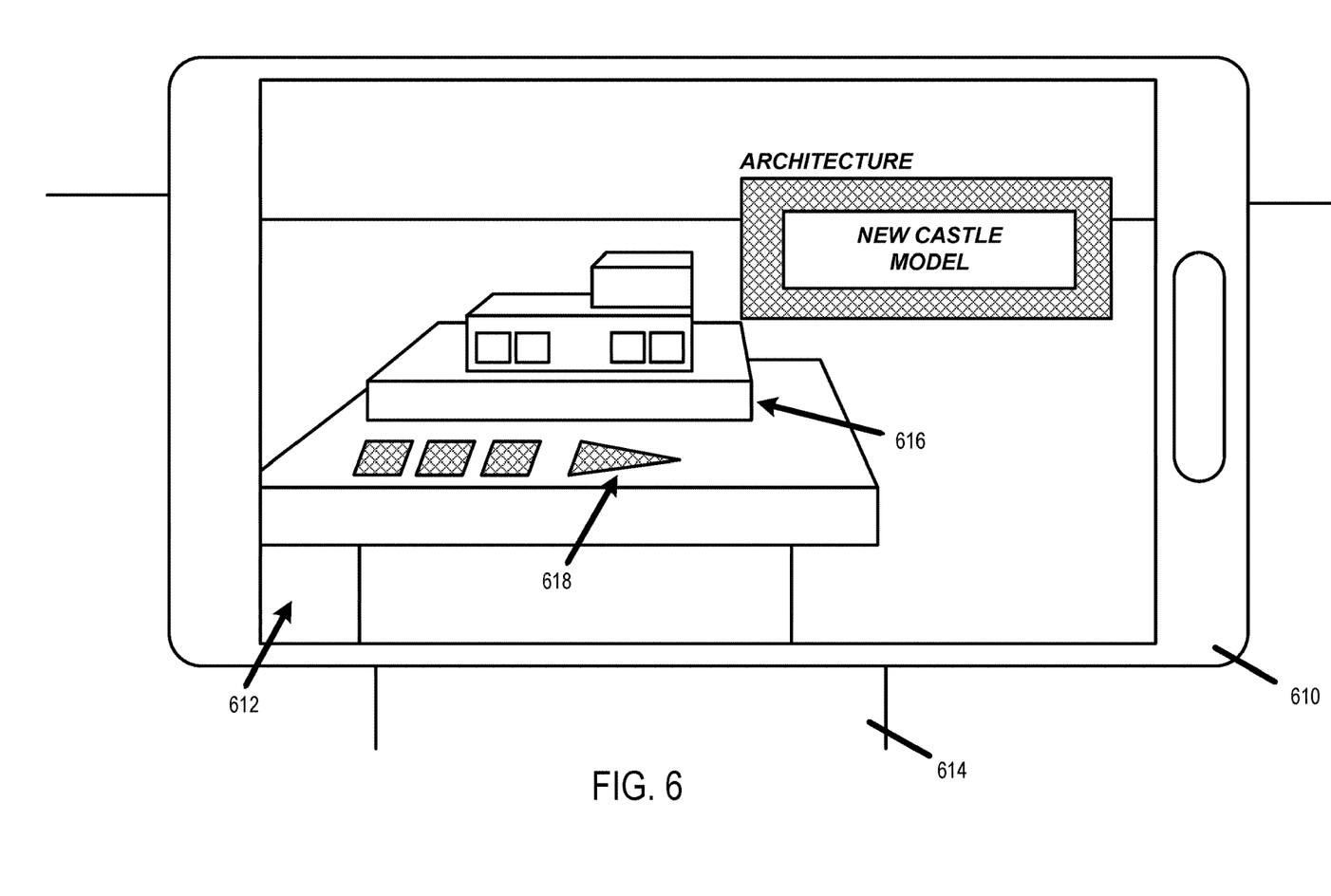
FIG. 6 depicts an example in which a mobile device is imaging a first physical world location via its camera and displaying wayfinding information.

FIG. 6 depicts an example in which a mobile device 610 is imaging a first physical world location via its camera. A camera view captured via the camera is displayed via display device 612. In this example, the first physical world location includes a table 614. Overlaid upon the camera view is virtual content 616 and 618. Virtual content 616 is a holographic model of an architectural design that is associated with a spatial anchor that is within the first physical world location. Virtual content 618 is an example of wayfinding information comprising a directional indicator (e.g., arrow) that directs a user to another spatial anchor located outside of the camera view.

Figure 7:
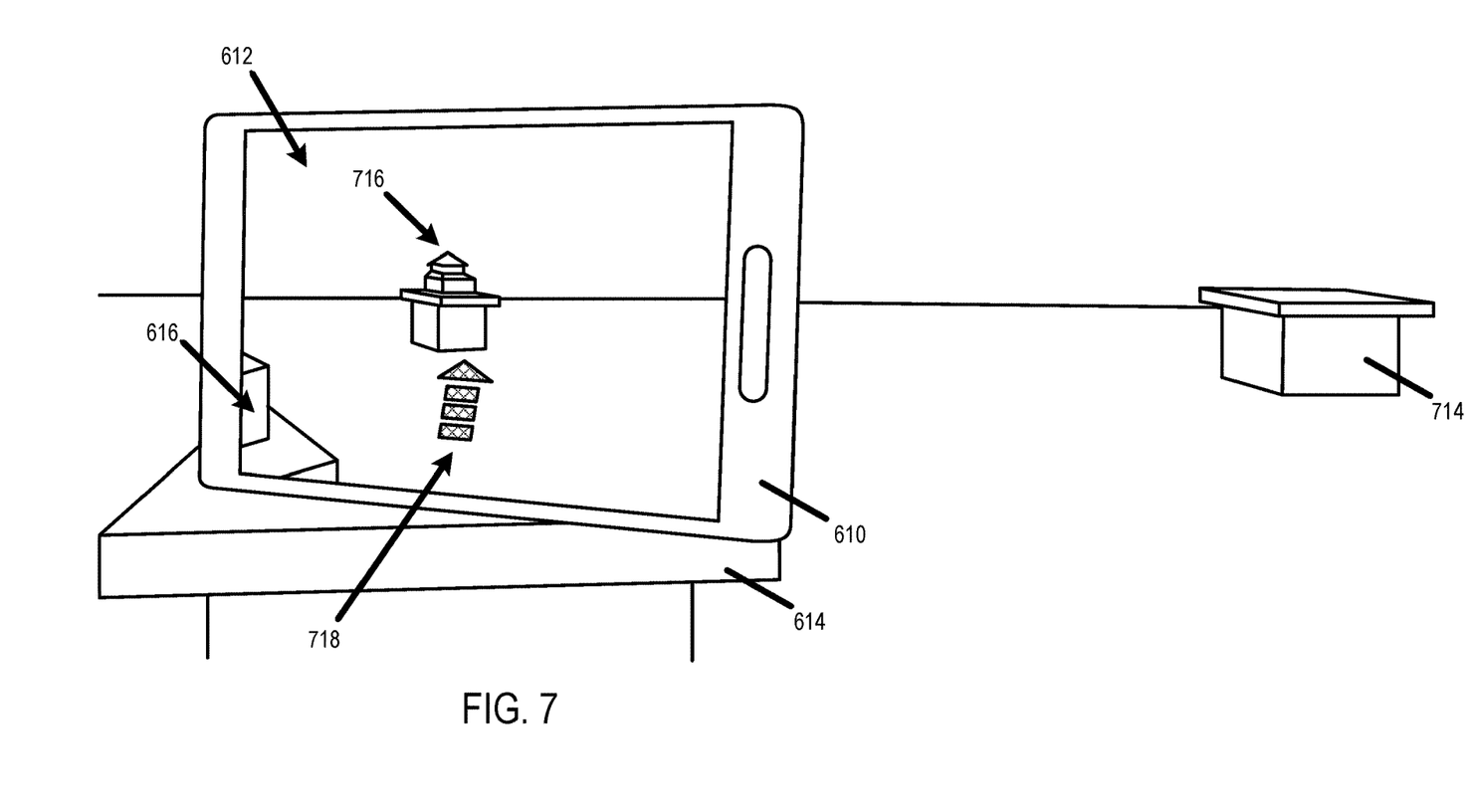
FIG. 7 depicts an example in which a mobile device is imaging a second physical world location via its camera and displaying wayfinding information.

FIG. 7 depicts mobile device 610 of FIG. 6 having moved so that its camera view captures a second physical world location containing another table 714. Overlaid upon the camera view is virtual content 716 and 718. Virtual content 716 is another holographic model of architectural design that is associated with another spatial anchor that is within the second physical world location. Virtual content 718 is an example of wayfinding information comprising a directional indicator (e.g., arrow) that directs a user to the spatial anchor with which virtual content 716 is associated. In some examples, the directional indicator may persist until the device is within a threshold proximity of the spatial anchor.

Another example provides a camera; a processor; and memory storing instructions executable by the processor to: capture, via the camera, first image data imaging a first physical world location; create a first spatial representation of the first physical world location based on the first image data; receive a user input defining a pose of a first virtual spatial anchor point relative to a feature imaged in the first image data; track user movement toward a second physical world location; capture, via the camera, second image data imaging the second physical world location; receive a user input defining a pose of a second virtual spatial anchor point relative to a feature imaged in the second image data; and send, to a remote computing device, data representing the first spatial representation, the pose of first virtual spatial anchor point, the second spatial representation, the pose of second virtual spatial anchor point, and a positional relationship between first virtual spatial anchor point and second virtual spatial anchor point identified from the user movement. In this or any other example disclosed herein, the pose of the first virtual spatial anchor point and the pose of the second virtual spatial anchor point each define a location relative to the computing device. In this or any other example disclosed herein, the location of each of the pose of the first virtual spatial anchor point and the pose of the second virtual spatial anchor point is defined in three-dimensional space relative to the computing device. In this or any other example disclosed herein, the pose of the first virtual spatial anchor point and the pose of the second virtual spatial anchor point each further define an orientation relative to the computing device. In this or any other example disclosed herein, the orientation of each of the pose of the first virtual spatial anchor point and the pose of the second virtual spatial anchor point is defined about a plurality of rotational axes that are orthogonal to each other. In this or any other example disclosed herein, computing device further comprises a depth sensor; and the instructions stored by the memory are further executable by the processor to: capture, via the depth sensor, first depth image data of the first physical world location; create the first spatial representation of the first physical world location further based on the first depth image data; capture, via the depth sensor, second depth image data of the second physical world location; and create the second spatial representation of the second physical world location further based on the second depth image data. In this or any other example disclosed herein, the instructions stored by the memory are further executable by the processor to: receive a user input defining a pose of a first virtual hologram relative to the first virtual spatial anchor point; and send, to the remote computing device, data representing the pose of the first virtual hologram. In this or any other example disclosed herein, the pose of the first virtual hologram defines a location and/or an orientation relative to the first virtual spatial anchor point. In this or any other example disclosed herein, the instructions stored by the memory are further executable by the processor to: send, to the remote computing device, data representing the first virtual hologram and/or an identifier of the first virtual hologram. In this or any other example disclosed herein, the instructions stored by the memory executable by the processor to: receive a user input defining a pose of a second virtual hologram relative to the second virtual spatial anchor point; and send, to the remote computing device, data representing the pose of the second virtual hologram, and one or more of the second virtual hologram and/or an identifier of the second virtual hologram.

Another example provides a method performed by a computing system, the method comprising receiving, from a first computing device, data representing: a first spatial representation of a first physical world location based on first image data captured via a camera, a pose of a first virtual spatial anchor point within the first image data, a second spatial representation of a second physical world location based on second image data captured via the camera, a pose of a second virtual spatial anchor point within the second image data, and a spatial relationship between the first virtual spatial anchor point and the second virtual spatial anchor point; receiving from a requesting computing device, data representing a third spatial representation of the first physical world location based on image data captured via a camera of the requesting computing device; comparing the third spatial representation received from the requesting device to one or more spatial representations received from the first computing device to identify the first spatial representation as matching the third spatial representation; determining a perspective-dependent pose of the first virtual spatial anchor point based on comparing the third spatial representation to the first spatial representation and the pose of the first virtual spatial anchor point; determining a perspective-dependent pose of the second virtual spatial anchor point based on the spatial relationship between the first virtual spatial anchor point and the second virtual spatial anchor point, and the pose of the second virtual spatial anchor point; and sending data representing the perspective-dependent pose of the first virtual spatial anchor point and the perspective-dependent pose of the second virtual spatial anchor point to the requesting computing device. In this or any other example disclosed herein, the method further comprises: receiving, from the first computing device, data representing a pose of a first virtual hologram relative to the first virtual spatial anchor point, and one or more of the first virtual hologram and/or an identifier of the first virtual hologram; and sending data representing the pose of the first virtual hologram, and one or more of the first virtual hologram and/or the identifier of the first virtual hologram to the requesting computing device. In this or any other example disclosed herein, the method further comprises: storing the data received from the first computing device in a storage device; and associating the first virtual hologram with the first virtual spatial anchor point in the storage device. In this or any other example disclosed herein, the pose of the first virtual hologram defines a location and/or an orientation relative to the first virtual spatial anchor point. In this or any other example disclosed herein, the method further comprises: receiving, from the first computing device, data representing a pose of a second virtual hologram relative to the second virtual spatial anchor point, and one or more of the second virtual hologram and/or an identifier of the second virtual hologram; and sending data representing the pose of the second virtual hologram, and one or more of the second virtual hologram and/or the identifier of the second virtual hologram to the requesting computing device.

Another example provides a computing device comprising: a graphical display device; a camera; a processor; and memory storing instructions executable by the processor to: capture, via the camera, image data imaging a first physical world location; create a spatial representation of the first physical world location based on the image data; send data representing the spatial representation to a remote computing service; receive, from the remote computing service, data representing a pose of a first virtual spatial anchor point relative to the computing device, the first virtual spatial anchor point being located within the first physical world location; receive, from the remote computing service, data representing a pose of a second virtual spatial anchor point relative to the computing device, the second virtual spatial anchor point being located within a second physical world location currently being out of view of the camera of the computing device; display, via the graphical display device, information regarding the location of second virtual spatial anchor point relative to the computing device; track motion of the computing device toward the second virtual spatial anchor point; and display, via the graphical display device, updated information regarding the location of the second virtual spatial anchor point relative to the computing device. In this or any other example disclosed herein, the instructions are further executable by the processor to: receive, from the remote computing service, additional data representing a pose of a first virtual hologram relative to the first virtual spatial anchor point, and one or more of the first virtual hologram and/or an identifier of the first virtual hologram; and display the first virtual hologram at the pose of the first virtual hologram relative to the first virtual spatial anchor point based at least in part on the additional data received from the remote computing service. In this or any other example disclosed herein, the pose of the first virtual spatial anchor point and the pose of the second virtual spatial anchor point each define a location and/or orientation relative to the computing device. In this or any other example disclosed herein, the computing device further comprises a depth sensor; and the instructions are further executable by the processor to: capture, via the depth sensor, first depth image data of the first physical world location; and create the spatial representation of the first physical world location further based on the first depth image data. In this or any other example disclosed herein, the information regarding the location of second virtual spatial anchor point relative to the computing device includes one or more of a graphical representation of a direction indicator and/or text representing navigation instructions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a camera;
   a processor; and
   memory storing instructions executable by the processor to:
   capture, via the camera, first image data imaging a first physical world location;
   create a first spatial representation of the first physical world location based on the first image data, the first spatial representation comprising a sparse point cloud identified by the computing device from the first image data captured via the camera;
   receive a user input defining a pose of a first virtual spatial anchor point relative to a feature within the first spatial representation comprising the sparse point cloud that was identified from the first image data;
   track user movement toward a second physical world location;
   capture, via the camera, second image data imaging the second physical world location;
   receive a user input defining a pose of a second virtual spatial anchor point relative to a feature imaged in the second image data;
   send, to a remote computing device, data representing the first spatial representation comprising the sparse point cloud, the pose of first virtual spatial anchor point, the pose of second virtual spatial anchor point, and a positional relationship between the first virtual spatial anchor point and the second virtual spatial anchor point identified from the user movement; and
   receive, from the remote computing device, data representing a perspective-dependent pose for the first virtual spatial anchor point, the data representing the perspective-dependent pose for the first virtual spatial anchor point being determined by the remote computing device based at least in part on the sparse point cloud.

2. The computing device of claim 1, wherein the pose of the first virtual spatial anchor point and the pose of the second virtual spatial anchor point each define a location relative to the computing device.

3. The computing device of claim 2, wherein the location of each of the pose of the first virtual spatial anchor point and the pose of the second virtual spatial anchor point is defined in three-dimensional space relative to the computing device.

4. The computing device of claim 2, wherein the pose of the first virtual spatial anchor point and the pose of the second virtual spatial anchor point each further define an orientation relative to the computing device.

5. The computing device of claim 4, wherein the orientation of each of the pose of the first virtual spatial anchor point and the pose of the second virtual spatial anchor point is defined about a plurality of rotational axes that are orthogonal to each other.

6. The computing device of claim 1, further comprising a depth sensor; and
   wherein the instructions stored by the memory are further executable by the processor to:
   capture, via the depth sensor, first depth image data of the first physical world location;
   create the first spatial representation of the first physical world location further based on the first depth image data;

capture, via the depth sensor, second depth image data of the second physical world location; and create a second spatial representation of the second physical world location further based on the second depth image data.

7. The computing device of claim 1, wherein the instructions stored by the memory are further executable by the processor to:

receive a user input defining a pose of a first virtual hologram relative to the first virtual spatial anchor point; and send, to the remote computing device, data representing the pose of the first virtual hologram.

8. The computing device of claim 7, wherein the pose of the first virtual hologram defines a location and/or an orientation relative to the first virtual spatial anchor point.

9. The computing device of claim 7, wherein the instructions stored by the memory are further executable by the processor to:

send, to the remote computing device, data representing the first virtual hologram and/or an identifier of the first virtual hologram.

10. The computing device of claim 1, wherein the instructions stored by the memory executable by the processor to:

receive a user input defining a pose of a second virtual hologram relative to the second virtual spatial anchor point; and send, to the remote computing device, data representing the pose of the second virtual hologram, and one or more of the second virtual hologram and/or an identifier of the second virtual hologram.

11. A method performed by a computing system, comprising:

receiving, from a first computing device, data representing:

a first spatial representation of a first physical world location based on first image data captured via a camera, the first spatial representation comprising a first sparse point cloud identified by the first computing device from first image data captured via a camera of the first computing device, a pose of a first virtual spatial anchor point relative to a feature within the first spatial representation comprising the first sparse point cloud that was identified by the first computing device from the first image data, a second spatial representation of a second physical world location based on second image data captured via the camera, the second spatial representation comprising a second sparse point cloud identified by the first computing device from second image data captured via the camera, a pose of a second virtual spatial anchor point relative to a feature within the second spatial representation comprising the second sparse point cloud that was identified by the first computing device from the second image data, and a spatial relationship between the first virtual spatial anchor point and the second virtual spatial anchor point;

receiving from a requesting computing device, data representing a third spatial representation of the first physical world location based on third image data captured via a camera of the requesting computing device, the third spatial representation comprising a third sparse point cloud identified by the requesting computing device from the third image data captured via the camera of the requesting computing device;

comparing the third spatial representation received from the requesting computing device to one or more spatial representations received from the first computing device to identify the first spatial representation comprising the first sparse point cloud as matching the third spatial representation;

determining data representing a perspective-dependent pose of the first virtual spatial anchor point based on the pose of the first virtual spatial anchor point and the first sparse point cloud at least by comparing the first sparse point cloud to the third spatial representation;

determining data representing a perspective-dependent pose of the second virtual spatial anchor point based on the spatial relationship between the first virtual spatial anchor point and the second virtual spatial anchor point, and the pose of the second virtual spatial anchor point; and sending the data representing the perspective-dependent pose of the first virtual spatial anchor point and the perspective-dependent pose of the second virtual spatial anchor point to the requesting computing device.

12. The method of claim 11, further comprising:

receiving, from the first computing device, data representing a pose of a first virtual hologram relative to the first virtual spatial anchor point, and one or more of the first virtual hologram and/or an identifier of the first virtual hologram; and sending data representing the pose of the first virtual hologram, and one or more of the first virtual hologram and/or the identifier of the first virtual hologram to the requesting computing device.

13. The method of claim 12, further comprising:

storing the data received from the first computing device in a storage device; and associating the first virtual hologram with the first virtual spatial anchor point in the storage device.

14. The method of claim 12, wherein the pose of the first virtual hologram defines a location and/or an orientation relative to the first virtual spatial anchor point.

15. The method of claim 12, further comprising:

receiving, from the first computing device, data representing a pose of a second virtual hologram relative to the second virtual spatial anchor point, and one or more of the second virtual hologram and/or an identifier of the second virtual hologram; and sending data representing the pose of the second virtual hologram, and one or more of the second virtual hologram and/or the identifier of the second virtual hologram to the requesting computing device.

16. A computing device, comprising:

a graphical display device;

a camera;

a processor; and memory storing instructions executable by the processor to:

capture, via the camera, image data imaging a first physical world location;

create a spatial representation of the first physical world location based on the image data, spatial representation comprising a sparse point cloud identified by the computing device from the image data captured via the camera;

send data representing the spatial representation comprising the sparse point cloud to a remote computing service;

receive, from the remote computing service, data representing a pose of a first virtual spatial anchor point relative to the computing device, the data representing the pose of the first virtual spatial anchor point being determined by the remote computing service based at least in part on the sparse point cloud, the first virtual spatial anchor point being located within the first physical world location;

receive, from the remote computing service, data representing a pose of a second virtual spatial anchor point relative to the computing device, the second virtual spatial anchor point being located within a second physical world location currently being out of view of the camera of the computing device;

display, via the graphical display device, information regarding the location of second virtual spatial anchor point relative to the computing device;

track motion of the computing device toward the second virtual spatial anchor point; and display, via the graphical display device, updated information regarding the location of the second virtual spatial anchor point relative to the computing device.

17. The computing device of claim 16, wherein the instructions are further executable by the processor to:

receive, from the remote computing service, additional data representing a pose of a first virtual hologram relative to the first virtual spatial anchor point, and one or more of the first virtual hologram and/or an identifier of the first virtual hologram; and display the first virtual hologram at the pose of the first virtual hologram relative to the first virtual spatial anchor point based at least in part on the additional data received from the remote computing service.

18. The computing device of claim 17, wherein the pose of the first virtual spatial anchor point and the pose of the second virtual spatial anchor point each define a location and/or orientation relative to the computing device.

19. The computing device of claim 16, further comprising a depth sensor; and wherein the instructions are further executable by the processor to:

capture, via the depth sensor, first depth image data of the first physical world location; and create the spatial representation of the first physical world location further based on the first depth image data.

20. The computing device of claim 16, wherein the information regarding the location of second virtual spatial anchor point relative to the computing device includes one or more of a graphical representation of a direction indicator and/or text representing navigation instructions.

* * * * *